United States Patent [19]
Ruhle

[11] Patent Number: 4,566,485
[45] Date of Patent: Jan. 28, 1986

[54] FREE-FLOATING NEUTRALLY-BUOYANT RECIPROCATING PUMP VALVE FOR ABRASIVE FLUIDS

[76] Inventor: James L. Ruhle, 2535 E. Balfour Ave., Fullerton, Calif. 92631

[21] Appl. No.: 673,125

[22] Filed: Nov. 19, 1984

[51] Int. Cl.[4] .............................................. F16K 15/02
[52] U.S. Cl. .................................... 137/375; 137/529; 137/534; 137/540; 251/368
[58] Field of Search ............... 137/375, 515, 517, 528, 137/529, 532, 534, 540

[56] References Cited

U.S. PATENT DOCUMENTS

| | | | |
|---|---|---|---|
| 455,913 | 7/1891 | Walker | 137/534 |
| 2,916,147 | 12/1959 | Checke | 137/534 X |
| 4,210,167 | 7/1980 | Koppe | 137/375 |
| 4,413,646 | 11/1983 | Platt | 137/375 X |

FOREIGN PATENT DOCUMENTS 633598 12/1949 United Kingdom ............... 137/540

Primary Examiner—Robert G. Nilson

[57] ABSTRACT

A free-floating neutrally-bouyant, stemless, externally-guided, and abrasion-resistant valve for reciprocating pumps that quickly responds to pressure-gradient reversals across its sealing surfaces. The neutral buoyency is attained by means of a hollow air-tight or nitrogen pressurized valve shaft and lead ballast, whereas the valve is guided directly into its valve seat by means of radial guide fins affixed to the exterior of the valve shaft that centralize the free-floating valve within the valve throat downstream from the valve's sealing surfaces. The sealing surface at the valve is protected against erosion from abrasive fluids by a hardfaced fluid deflector just upstream from its sealing surface, whereas the valve seat is protected from erosion by a hardfaced fluid deflector just upstream from the valve seat.

1 Claim, 1 Drawing Figure

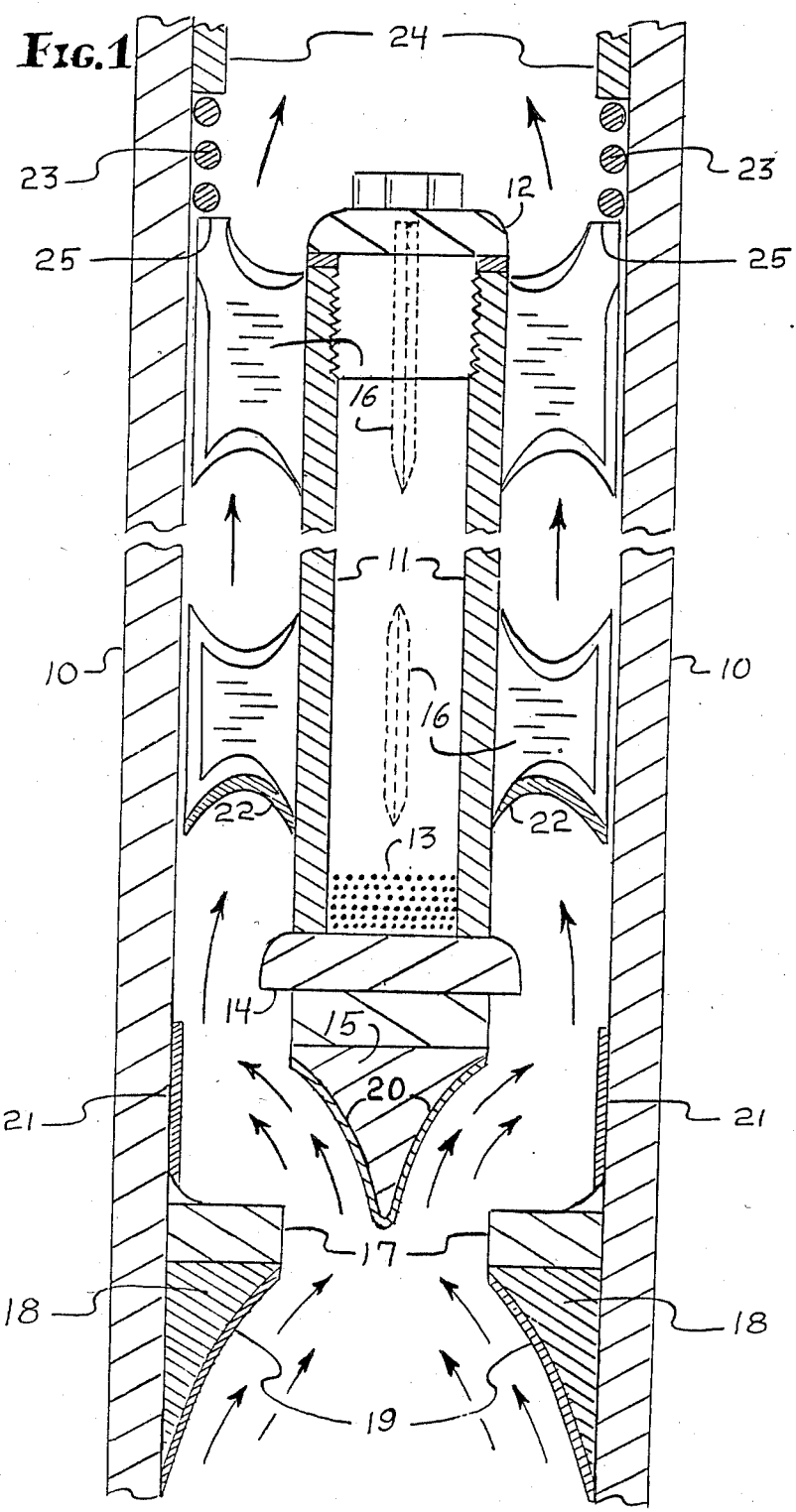

FREE-FLOATING NEUTRALLY-BUOYANT RECIPROCATING PUMP VALVE FOR ABRASIVE FLUIDS

BACKGROUND

Reciprocating-pump valves actuated by pressure-gradient reversals within the fluid passing through their sealing surfaces are generally spring-loaded, and, or gravity assisted in one manner or another. Such valves require additional hydraulic energy to overcome the spring-loading or dead weight of the valve, which interferes with the cyclic harmony and smooth rhythmic operation of the pressure-actuated valve, thus reducing the efficiency of pumps employing such valves. Therefore, if a pressure-actuated reciprocating pump valve were designed that was neither spring-loaded nor gravity-assisted in its operation, such as a valve that was neutrally-buoyant, or of the same overall density as that of the fluid being conveyed through it, such a valve would react immediately to pressure-gradient reversals, conserve hydraulic energy, and increase pump efficiency.

Reciprocating piston pumps and reciprocating plunger pumps used in oil-field operations to pump sand-laden drilling fluids or hydraulic-fracture fluids, and reciprocating pumps used by the mining industry to pump abrasive slurries through pipelines employ valves which are guided by means of valve stems and valve guides with cross arms. Such valve guides and cross arms, which are an integral part of the valve seat, are relatively massive valve-seat elements, and are located immediately upstream from the valve in the region where the fluid is pumped through the valve seat, thus, creating a sizeable obstruction right in the region where the concentrated and abrasive fluid funnels through the valve seat. Such an opstruction interferes with the flow of fluid through the valve-seat orifice and the smooth rhythmic operation of the valve, resulting in wasted hydraulic energy and reduced pump efficiency. Therefore, if a reciprocating-pump valve were designed that eliminated such large mid-stream opstructions in the critical valve-seat region, and, instead, guided the valve externally into the valve seat by means of radial guide fins which offered only minimal resistance to the abrasive fluid pumped through the valve, then such a valve system would further conserve hydraulic energy and should further improve pump efficiency.

Pump valves and valve seats used in reciprocating pumps are often so badly eroded by abrasive fluids passing through the valve seats and around the valves that pumping efficiency is reduced considerably. Therefore, if the valve seat and the sealing surface of the valve were protected by deflecting surfaces in such a manner so as to reduce such abrasion or erosion then such a valve system would also conserve hydraulic energy and should also improve pump efficiency.

SUMMARY OF INVENTION

It is among the objects of the invention to provide a new and improved reciprocating pump valve that is neutrally buoyant, or is of the same overall density as the fluid which is conveyed through the valve, and, therefor, reacts immediately to pressure-gradient reversals.

Another object of the invention is to provide a new and improved reciprocating-pump valve that is externally guided by radial fins, and, therefore, eliminates the valve guide and cross arms that otherwise would obstruct the flow of fluid in the critical region where the fluid is funneled through the valve seat.

Still another object of the invention is to provide a new and improved pump valve that incorporates a hardfaced deflecting surface immediately upstream from the valve seat so as to shield and protect the valve seat from abrasive fluid passing through it, and incorporates a hardfaced deflecting surface immediately upstream from the valve so as to shield and protect the valve's sealing surface from abrasive fluid passing around the valve.

With these and other objects in view, the invention consists in the arrangement and combination of the various components whereby the objects contemplated are attained, as hereinafter set forth, in the appended claims and accompanying drawing.

In the drawing:

FIG. 1 is a schematic sectional view of the pump valve.

Drawing on a typical condition as an example in describing the components of the invention, it can be assumed that the valve is fabricated from ordinary carbon steel, and is enclosed by a cylindrical valve throat, also fabricated from ordinary carbon steel, and measuring four inches in inside diameter, whereas the valve body, or hollow valve shaft is also cylindrical, measuring $1\frac{1}{4}$ inches in inside diameter. Carbon steel vanes, or fins, affixed in a radial manner to each end of the hollow valve shaft are ground to a knife edge on their leading and trailing edges for maximum hydrodynamic efficiency, and ground on their side edges to a knife edge to reduce the area of contact between the edges of the fins and the inside surface of the valve throat as the valve is centralized and guided into the valve seat by the radial fins. The fins are also swept back on their leading and trailing edges in such a manner that discourages suspended solids from wedging between the fin edges and the surface of the valve throat.

The neutral buoyancy is attained by means of the hollow air-tight cylindrical valve shaft, which can also be pressurized by nitrogen or some other suitable gas in applications involving deep wells where the hollow valve shaft might be subjected to a considerable amount of hydrostatic pressure. In such application involving deep wells, or in other applications where the density of the fluid passing through the valve might be changed from time to time, the buoyancy of the valve may be adjusted by making the necessary ballast adjustments. Such ballast adjustments are made by adding a sufficient quantity of lead shot to the inside ot the valve shaft to achieve neutral buoyancy with a fluid of increase density, or by removing a sufficient quantity of lead shot from the inside of the valve shaft to achieve neutral buoyancy with a fluid of decreased density. The lead shot is added to or subtracted from the ballast inside the hollow valve shaft through a threaded and sealed plug at the downstream end of the valve shaft.

The valve seat is shielded on its upstream side by a circular and concave deflector, circumventing the underside of the valve-seat orifice. The deflector, hardfaced with tungsten carbide, diverts the abrasive fluid inwardly and centrally through the valve-seat orifice in such a manner that the valve seat is shielded behind the inward-deflected fluid. In like manner, the concentrated column of abrasive fluid passing through the central region of the valve-seat orifice is split down the center and deflected outward by a cone-shaped deflector, also hardfaced with tungsten carbide, and positioned just upstream from the valve's sealing surface, which shields the latter behind the outward-deflected fluid. The lower part of the valve throat is also hardfaced with tungsten carbide to resist erosion by the abrasive fluid diverted outward by the cone-shaped deflector and against the that part of the valve throat. The leading edges of the radial fins are also hardfaced with tungsten carbide to resist erosion by the abrasive fluid passing through the fins.

A coil spring situated downstream from the valve's downstream set of radial fins provides shock absorption to the valve when it is thrusted into the fully-opened position, and acts as a valve stop, thus limiting the travel distance of the valve. The stored energy in the coil spring also accelerates the valve in the direction of the valve seat when the pressure gradient is reversed, thus reducing the valve's reaction time when it closed, whereas a certain degree of hydraulic shock absorption is provided when the sealing surfaces between the valve and the valve seat come together and drive the fluid out from between the two, which also drives out any particulate matter from between the sealing surfaces FIG. 1 illustrates a typical embodiment of the invention and depicts the steel valve throat, 10, which encloses the free-floating steel valve, composed of the hollow valve shaft, 11, the threaded and sealed valve-shaft plug, 12, the ballast, 13, the valve's sealing surface, 14, the cone-shaped deflector, 15, and the radial fins, four of which are designated, 16. The steel valve seat, 17, and the steel valve-seat deflector, 18, are affixed to the steel valve throat, 10, whereas the valve-seat deflector, 18, is hardfaced with a layer of tungsten carbide, 19. The valve's cone-shaped deflector, 15, is hardfaced with a layer of tungsten carbide, 20, and the bottom part of the valve throat, 10, is hard-faced with a layer of tungsten carbide, 21, whereas the leading edges of all the radial fins are hardfaced with a bead of tungsten carbide, two of which are designated, 22. The coil spring, 23, situated immediately upstream from the shoulder, 24, which is affixed to the valve throat, 10, is compressed between the shoulder, 24, and the squared-off trailing edges, 25, of the downstream set of radial fins, 16.

The arrows depict the fluid flow through the valve-seat orifice, around the valve's sealing surface around the valve shaft and downstream through the valve's radial fins.

If for some reason it is desirable for the valve to favor one direction or another when the pump is inoperative, additional ballast may be added to keep the valve closed, and extra ballast may be removed to keep the valve open when the pump is in the vertical or near-vertical position.

Since the valve seat and the sealing surfaces of the valve are both shielded by the deflectors from erosion by abrasive fluid pumped through the valve, it should only be necessary to grind the sealing surfaces to a smooth finish and chrome plate the sealing surfaces for protection against corrosion with no need for hardfacing of the sealing surfaces. For applications involving corrosive fluids the entire valve system would be chrome plated.

In subsurface applications involving deep wells and high hydrostatic pressures the threaded and sealed valve-shaft plug would be equipped with a metal spring-energized C-ring or some other seal that is suitable for such high pressures.

Having described examples of employing the present invention, I claim:

1. A free-floating neutrally-buoyant reciprocating-pump valve for abrasive fluids comprising:
   a cylindrical valve throat which encloses a free-floating valve,
   a neutrally-buoyant valve which responds quickly to pressure-gradient reversals in the fluid conveyed through the valve,
   a ballast system which allows the buoyancy of the valve to be adjusted so as to correspond with changes in the density of the fluid conveyed through the valve,
   a means to guide the valve consisting of a plurality of radial fins which are affixed to the valve, and centralize and guide the valve through the valve throat and directly into the valve seat,
   a valve seat, which is affixed to the valve throat,
   a hardfaced fluid deflector which is affixed to the valve throat and the valve seat just upstream from the valve seat,
   a hardfaced cone-shaped fluid deflector, which is situated just upstream from a sealing surface of the valve,
   a hardfaced region in the valve throat which is situated just downstream from the valve seat,
   a coil spring and internal shoulder situated inside the valve throat just downstream from the trailing edges of the radial valve fins.

* * * * *